July 17, 1923.
J. LE R. BANKS
HEAT TRANSMISSION
Filed Aug. 29, 1921
1,462,079
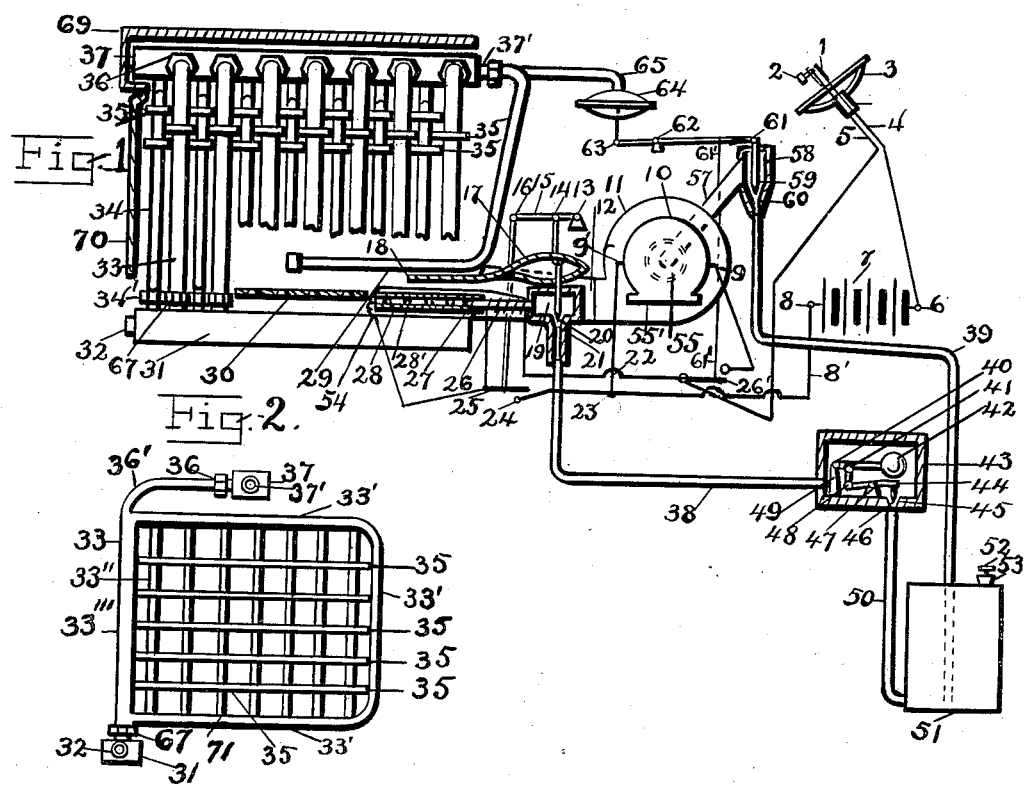
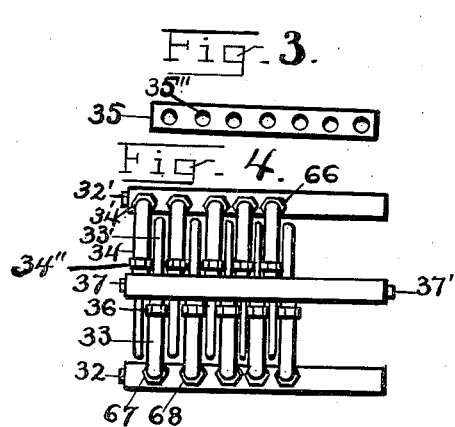
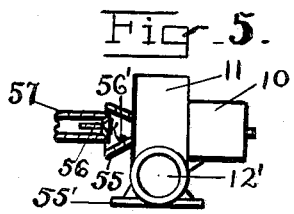
Joseph LeRoy Banks
INVENTOR.
BY Albert Rosenberg
ATTORNEY.

Patented July 17, 1923.

1,462,079

UNITED STATES PATENT OFFICE.

JOSEPH LE ROY BANKS, OF BALTIMORE, MARYLAND.

HEAT TRANSMISSION.

Application filed August 29, 1921. Serial No. 496,726.

*To all whom it may concern:*

Be it known that I, JOSEPH LE ROY BANKS, a citizen of the United States, residing at 308 North Carey Street, in Baltimore city, in the State of Maryland, have invented a new and useful Improvement in Heat Transmission, of which the following is a specification.

My invention relates to heat circulating systems and particularly to power generating plants for supplying power to machinery of all kinds and to vessels plying the waters as well as to vehicles using roadways and operating farm machinery, or navigating the atmosphere. It particularly relates to and concerns the method of construction and adaptation of the various elements which enter into the construction of vapor generators; and in improvements in the preheating devices; and also in the automatic control of the fuel flow to the combustion chamber; and of an electric preheating and igniting combination, automatically controlled to assure prompt ignition of the fuel when heated by the preheater, and of a pilot light construction which will assure the operator of a dependable pilot light with the least amount of care.

The objects of my invention are: 1st, to provide a new vapor generating unit for the transmission of power to machinery, vehicles, vessels, and flying machines. 2nd, to provide greater generating surface in a given area of space. 3rd, to provide a new method for arranging the sections of a vapor generating unit. 4th, to provide a new plan for attaching the generating vapor units to the manifolds; to provide baffle plates or fins for the generating units. 5th, to provide a perforated tubular preheating device for converting the fuel into a gaseous state, similar to a plumber's torch. 6th, to provide an infusible easily made incandescent igniter, electrically operated, to ignite the pilot light, or the gaseous fuel. 7th, to provide an electrically heated preheated tube for primarily heating the fuel to a gaseous state. 8th, to provide an automatic thermostat for controlling the igniting incandescent filament and the electrically heated primary preheating tube, as well as the flow of fuel to said preheating tube. 9th, to provide a secondary tank, intermediate of the main fuel supply, to control the fuel to the pilot light. 10th, to provide a float-controlled valve in a tank for regulating the fuel flow. 11th, to provide a power blower with a fuel pipe leading to its suction end, said fuel pipe controlled automatically by a pressure regulator and a butterfly valve. 12th, to provide a pilot light with a primary and a secondary preheater for the fuel supply leading to the pilot, both being independent of the firebox.

I do not care to limit myself to these particular objects, since other objects will be apparent herein.

Referring to the drawings:—

Figure 1 is a diagram showing a side elevation of the boiler with its pilot light and the control systems embodying my invention, and the several mechanisms showing their operating relation.

Figure 2 is a side view of a section of the boiler or vaporizer and baffle plates or fins in position.

Figure 3 is a plan view of the baffle plates or fins.

Figure 4 is a plan view of the boiler or vapor generator showing the method of attaching the several units to the water and stream manifolds.

Figure 5 is the front elevation of the motor operated blower, showing the oil intake tube and its valve.

Referring to Figure 1, the numerals mentioned coincide with similarly mentioned parts in the several other figures in which the vapor generator may or may not be surrounded by a refractory lined casing or shell 69 and 70; it being common practice to cover boilers and vapor generating units with refractory materials.

1 is a switch, and the key 2 of which is secured to a steering wheel of a vehicle controlling the terminal 6 of the battery 7 through the lead wire 4 and operating when the switch is closed to flow the current from said battery 7 through the wire 5 to the switch 26 controlling the current to the terminal 9 on the motor 10, secured to the pressure blower 11 having its outlet 12 terminating in the combustion chamber or fire box under the grid 30 and under the superheating tube 29. The other terminal 8 of the battery 7 (which may be either a primary or a storage battery fed by a generator on the shaft of the vehicle or operated by the shaft) supplies the current through the wire 8' to the terminal 9' on the motor 10 completing the circuit; while the same wire 8' (crossing at 22 but out of contact with the lead wire from the switch 26') is made in contact at 23 with the switch terminal 24 which when closed by the switch 25 throws the current also into the preheating helix 26 around the preheating tube 27, at the same time passing to the filament 54 making it incandescent so that when the gas enters the preheating tube 27 it will be ignited as soon as it leaves the torch tube 28 at the end of the electric preheating tube 27 As soon as the preheating tube 27 is hot enough to generate gas, it affects the thermostatic regulator 17 which may be constructed in the usual way of composite metals easily affected by changes of temperatures, such as steel and brass which by expansion opens the valve 20 away from its seat 21. The thermostat 17 is not operated by the gas generated, but by the heat developed by the preheating device, though the inventor does not wish to limit himself to any specific thermostatic regulator, since he may use the pressure of the gas generated by the heat from the preheater to operate such a regulator, provided with an extension 18 over the torch tube 28 provided in the usual way with the openings 28' along its length; this thermostatic regulator 17 is secured to the valve 20 which in operation it moves from the seat 21 in the fuel preheating chamber 19 secured to the preheating tube 27.

It is intended that the torch tube 28 which is metallically secured to the fuel supply pipe and is fixed intermediate of the electrical preheater 27 and the fire box in such a way that it forms a secondary preheater independently of the fire box.

It is commonly known that a "painter's" or plumber's" torch has a tube in which the flame burns, slightly different from the ordinary Bunsen tube or burner, and the said "painter's" torch tube becomes hotter and is more quickly heated than the said Bunsen form, which enables the former type to act as a secondary preheater when attached to my fuel supply pipe.

It will be seen that the torch tube 28 and the electric preheater 27 construct a dual or plural preheating devices.

The filament 54 is the primary igniting means by which the secondary igniting means, the pilot light or torch tube 28 ignites the fuel in the fire box.

Thus it will be seen that the torch tube 28 serves a dual purpose, that of a pilot light and also a preheater, independent of the fire box.

This thermostatic regulator 17 is also connected at 14 to the lever 15 pivoted in the fulcrum 13; the lever 15 is connected to the switch 25 operating to lift said switch away from the terminal or contact point 24, thereby breaking the electric current from the battery at both the incandescent filament and the electric preheating tube. At the same time the pressure in the boiler tubes have been increased by the flame from the torch tube 28 playing on the generating tubes 33'' and the superheater tube 29, operates through the steam pipe 65 leading to the pressure regulator 64 with its diaphragm of usual construction, connected to the lever 63 pivoted in the fulcrum 62 and secured at one end 61 to the valve 59 in the auxiliary chamber 58, which valve it holds away from its seat 60, thereby allowing the fuel to flow by the suction of the blower 11, through the pipe 57 to mix with the air drawn into said blower 11 through the intake 55. The valve 56 in Figure 5, operated by the spring 56', serves to shut off the fuel immediately upon the stopping of the blower 11. 55' is the base of the blower, while 12' is the outlet from said blower. Lever 63 is also secured at 61' to the switch 26' which it closes, thereby throwing the current from the battery 7 into the motor 10 secured to the blower 11. In the auxiliary tank 43 the fuel flows in the usual manner or is forced into it from the main fuel tank 51 through the tube 50, and when the fuel is at a definite height in the auxiliary tank by a fixed predetermination, the float 42 operating lever 41 pivoted in its fulcrum 49 at 40 and connected by the link 48 to the lever 44 pivoted in the fulcrum 47 causing the valve 46 to shut off the seat 45 and the flow of fuel into the auxiliary tank 43.

52 is a plug inserted in the socket 53 by which the fuel is placed in the main tank 51. The boiler or vapor generator is provided with the hood or cover 69 and sectional sides 70 by which access to the tubular units 33 may be had for their renewal or repair.

These tubular units 33, it will be observed, are made of a water riser 33''' and a horseshoe header tube 33'; and in line with the water riser 33''' are secured the vapor generating tubes 71. At the top of the water riser 33''' is secured at one end the elbow tube 36' secured by its union 36 to the vapor manifold 37, and at the bottom of the water riser 33''' is secured the union 67 by which it is secured to the water manifold 31, while its alternate mate 34 is secured on the opposite side of the vapor manifold 37 by its union joint 34'' and to the water manifold 32' by its union joint 34'. Onto or slidably attached to the vapor tubes 33'' are arranged the baffle plates or fins 35.

The hood or cover 69 and sides 70 may be lined with asbestos or other refractory material, and I do not care to limit myself to any particular construction of inclosing casing, either of the hood or sides.

The helix 26 on the electrically heated preheating tube 27, is embedded in the usual way with some refractory infusible insulating material such as is used in electric sad irons or small electric furnaces, the resistance unit thereby being protected from harm also by inclosing the heating unit in a metal casing surrounding the refractory insulating material over the helix. Since it is common practice to inclose the heating resistance and its attending insulation, it is not thought necessary to illustrate it.

It will be seen that I employ the power of the electric current to heat a filament to incandescence for igniting the fuel, thereby assuring greater igniting area and more positive action than that provided by an electric spark and also obviating the obstruction of contacts by carbonization, through vaporization of any carbon which may by chance get upon the igniting filament.

This igniting filament need not necessarily be raised to incandescence, but to a heat sufficient to keep it clean and ignite the fuel.

I do not care to limit myself to any particular construction or design, nor to any particular method of adaptation of the various elements I have disclosed. In using the term vaporizer, I include all apparatus for heating water, whether for heating systems or for power purposes.

I claim:

1. In a heat circulating system, a secondary preheater independent of the fire box, secured to the fuel supply, an electrical or primary preheater secured to the fuel supply intermediate of the secondary preheater and the fuel supply, and means for starting the primary preheater.

2. In a heat circulating system, a main burner (the fire box) and an auxiliary burner (the pilot), a primary preheating means for the fuel to the auxiliary burner, and a secondary preheating means for the said fuel to the auxiliary burner, said secondary preheating means being directly secured to the fuel supply pipe intermediate of the fire box and the primary preheating means, and means for starting the preheating means.

3. In a heat circulating system, a fire chamber, a series of circulating units arranged around the fire chamber, a pressure blower provided with an outlet leading to the fire chamber, a fuel supply pipe arranged to supply fuel to the intake or suction end of the said blower.

4. In a heat circulating system, a fire chamber, a series of circulating units arranged around the fire chamber, a pressure blower provided with an outlet leading to the fire chamber, a fuel supply pipe arranged to supply fuel to the intake or suction end of said blower, and a valve for automatically closing the fuel supply pipe when the blower is not in operation.

5. In a heat circulating system, a fire chamber, a pressure blower for supplying fuel to the fire chamber, and a fuel supply pipe leading to the intake or suction end of the said blower.

6. In a heat circulating system, a fire chamber, a pressure blower for supplying fuel to the fire chamber, a supply pipe for supplying fuel to the pressure blower, and a valve for automatically shutting off the fuel when the blower ceases to operate.

7. In a heat circulating system, a fire chamber, a means for blowing fuel into the fire chamber, means for supplying fuel to the blowing means, and means operated by the circulatory system for regulating the flow to the blowing means.

8. In a heat circulatory system, a fire chamber, a fuel tank, an auxiliary tank connected with the fuel tank and provided with means for automatically increasing the flow of fuel into the said auxiliary tank, connection with the auxiliary tank for supplying fuel to the fire chamber through the suction end of a blower whereby the fuel is drawn from the auxiliary tank.

9. In a heat circulating system, the combination with fuel burning apparatus and means for supplying fuel thereto, of automatic ignition mechanism for the fuel burning apparatus, a preheating mechanism automatically controlled by a thermostat heated by the preheater, an ignition mechanism likewise controlled by the said thermostat, and a fuel supply also controlled by the said thermostat.

10. In a heat circulating system, the combination with fuel burning apparatus and means for supplying fuel thereto, of an automatic ignition mechanism and automatic preheating mechanism for the fuel burning apparatus, said fuel supplying means, embodying means for preventing the flow of fuel, operable by the preheating means, whereby the said preventative means controls the fuel supply whenever the preheating means becomes inoperative.

11. In a heat circulating system, the combination of circulating units and fuel burning apparatus, ignition mechanism therefor, preheating means for the fuel supply, automatic controlling means regulated by the preheating means for controlling the fuel burning apparatus, and the said preheating means controlled by an electric switch.

12. In a heat circulating system, the combination of circulating units and fuel burning apparatus, ignition mechanism therefor, automatic controlling means regulated by the circulatory system for controlling the fuel burning apparatus, a preheating device controlled by an electric switch, and automatic means for controlling the fuel supply when the preheating means fails to operate.

13. In a heat circulating system, the combination of circulating units and fuel burning apparatus, a primary and a secondary ignition mechanism therefor comprising an electric filament and a pilot light, automatic controlling means regulated by the circulatory system for controlling the fuel burning apparatus, a primary and a secondary preheating device for the fuel supply to the ignition mechanism comprising an electric coil and a torch tube secured to the pilot light.

14. In a heat circulating system, the combination of circulating units and fuel burning apparatus, a pilot light therefor, automatic controlling means regulated by the circulatory system for controlling the fuel burning apparatus, a primary and a secondary preheating device for the pilot light, an igniter for the pilot light, and means for preventing the flow of fuel to the pilot light when the flame is quenched.

15. In a heat circulating system, the combination of circulating units and fuel burning apparatus, a pilot light therefor, automatic controlling means operated by the circulatory system for controlling the fuel burning apparatus comprising the pressure regulator 64, a primary and a secondary preheating device for the pilot light, an igniter for the pilot light, and automatic means for controlling the fuel to the pilot light.

16. In a heat circulating system, the combination of circulating units and fuel burning apparatus, a pilot light for igniting the fuel, automatic controlling means regulated by the circulatory system for controlling the fuel burning apparatus, a plural preheating means for the fuel to the pilot light, an automatic fuel control for the pilot light, means for automatically igniting the pilot light, means for supplying fuel to the fuel burning apparatus, and automatic means for shutting off the fuel supply as well as turning the fuel on, controlled by the preheater.

17. In a heat circulating system, the combination of a fuel supply reservoir and means for conveying the fuel to a burner, means for controlling the fuel to the burner, a thermostatic controlling device for controlling a switch supplying current of electricity to a preheating device and to an igniting filament, said thermostatic device operating to open the switch to shut off the current from both the preheater and the igniting filament when the thermostat becomes heated, a suction blower for conveying fuel from the reservoir to the combustion chamber, operated by an electric motor and a switch automatically controlled by a pressure regulator and operating to close the switch when the fuel is burning, and automatically opening the switch when the pressure diminishes by virtue of the fire being quenched, or the operator opens the operator's switch.

18. In a heat circulating system, the combination of a fuel burning apparatus, a pilot light and a thermostat regulating the valve controlling the fuel to the pilot light, and the said thermostat controlling the operation of a preheating mechanism as well as an igniting mechanism, a multiple preheating device for preheating the fuel to the pilot light, the said thermostat also operating to shut off the current from the preheater and the igniter when the pilot is lit.

JOSEPH LE ROY BANKS.